United States Patent
Anisi et al.

(10) Patent No.: US 11,101,664 B2
(45) Date of Patent: Aug. 24, 2021

(54) POWER SYSTEM OPTIMIZATION

(71) Applicant: ABB Schweiz AG, Baden (CH)

(72) Inventors: David Anisi, Oslo (NO); Stein Trostheim, Ski (NO); Einar Oftebro, Halden (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/976,356

(22) PCT Filed: Mar. 18, 2019

(86) PCT No.: PCT/EP2019/056716
§ 371 (c)(1),
(2) Date: Aug. 27, 2020

(87) PCT Pub. No.: WO2019/179949
PCT Pub. Date: Sep. 26, 2019

(65) Prior Publication Data
US 2021/0013721 A1    Jan. 14, 2021

(30) Foreign Application Priority Data
Mar. 19, 2018  (EP) ..................................... 18162642

(51) Int. Cl.
*H02J 3/46* (2006.01)
*G05B 19/042* (2006.01)
*H02J 3/38* (2006.01)

(52) U.S. Cl.
CPC .............. *H02J 3/46* (2013.01); *G05B 19/042* (2013.01); *H02J 3/381* (2013.01);
(Continued)

(58) Field of Classification Search
CPC .......... H02J 3/46; H02J 3/381; H02J 2300/28; H02J 2203/20; H02J 2300/22; G05B 2219/2619; G05B 19/042
See application file for complete search history.

(56) References Cited

U.S. PATENT DOCUMENTS

| 5,278,772 A | 1/1994 | Knupp |
| 5,621,654 A | 4/1997 | Cohen et al. |
| (Continued) | | |

FOREIGN PATENT DOCUMENTS

| EP | 2940536 A1 | 11/2015 |
| RU | 2354024 C1 | 4/2009 |
| (Continued) | | |

OTHER PUBLICATIONS

Extended European Search Report Application No. EP18162642 Completed: Aug. 1, 2018; dated Aug. 9, 2018 9 pages.
(Continued)

*Primary Examiner* — Thomas C Lee
*Assistant Examiner* — Charles Cai
(74) *Attorney, Agent, or Firm* — Whitmyer IP Group LLC

(57) ABSTRACT

A method set point determining device and computer program product for determining set points of machines, energy storage units, wind generators and/or solar panels in a power system. The set point determining device includes an efficiency curve determining unit configured to determine, during operation of the power system, current individual efficiency curves of machines, energy storage units, wind generators and/or solar panels, each curve defining the efficiency of the corresponding machine, energy storage unit, wind generator and/or solar panel, where a current efficiency curve is obtained as a real-time estimation using current and historic power system data, and an optimization handling unit configured to, at a point in time of power system control, form a function including a first expression, which is a sum of products, each product including the power of a machine, energy storage unit, wind generator and/or solar panel times the individual efficiency of the machine, energy storage unit, wind generator and/or solar panel obtained from the corresponding current individual (Continued)

efficiency curve, determine a power demand of the system, optimize the function subject to the condition that the sum of powers of the machines, energy storage units, wind generators and/or solar panels reach the power demand, determine desired set points of the machines, energy storage units, wind generators and/or solar panels based on the optimization and supply the set point to the machines, energy storage units, wind generators and/or solar panels.

19 Claims, 3 Drawing Sheets

(52) U.S. Cl.
CPC ... *G05B 2219/2619* (2013.01); *H02J 2203/20* (2020.01); *H02J 2300/22* (2020.01); *H02J 2300/28* (2020.01)

(56) References Cited

U.S. PATENT DOCUMENTS

| | | |
|---|---|---|
| 2002/0120412 A1 | 8/2002 | Hayashi et al. |
| 2006/0085363 A1 | 4/2006 | Cheng et al. |
| 2010/0094490 A1* | 4/2010 | Alston ................. B63H 21/17 701/21 |
| 2010/0185336 A1 | 7/2010 | Rovnyak et al. |
| 2013/0226458 A1* | 8/2013 | Nakamura ................ F03D 9/28 702/3 |
| 2014/0285010 A1* | 9/2014 | Cameron .................. H02J 1/14 307/29 |
| 2016/0258361 A1 | 9/2016 | Tiwari et al. |
| 2018/0022339 A1* | 1/2018 | Leone ................ F02M 25/0227 701/22 |
| 2019/0096301 A1* | 3/2019 | Chaji ................... G09G 3/3291 |
| 2019/0115758 A1* | 4/2019 | Orban ....................... H02J 3/30 |
| 2019/0267805 A1* | 8/2019 | Kothuru .............. H02J 13/0006 |

FOREIGN PATENT DOCUMENTS

| | | |
|---|---|---|
| RU | 2642422 C2 | 1/2018 |
| SE | 1600140 A1 | 4/2016 |
| SE | 1600151 A1 | 5/2016 |
| WO | 2011161211 A2 | 12/2011 |

OTHER PUBLICATIONS

International Preliminary Report on Patentability Application No. PCT/EP2019/056716 Completed: Feb. 17, 2020; dated Feb. 17, 2020 16 pages.
International Search Report and Written Opinion of the International Searching Authority Application No. PCT/EP2019/056716 Completed: May 27, 2019; dated Jun. 5, 2019 16 pages.
Canadian Office Action; Application No. 3,093,773; dated Oct. 16, 2020; 7 Pages.

* cited by examiner

POWER SYSTEM OPTIMIZATION

TECHNICAL FIELD

The present invention relates to a method, set point determining device and computer program product for determining set points for machines in a power system.

BACKGROUND

In power plants the efficiency of power supply units, such as machines energy storage systems, wind turbines and/or solar panels used to generate and/or receive power is an important feature. The power or load of these power supply units may then be determined in a number of ways, where the traditional way is to share the load equally between them.

However, there are other ways in which a load distribution may be determined. Various ways of calculating load distribution are for instance described in SE1600151 and SE1600140.

Another way is described in EP 2940536, where an optimization problem is defined based on the actual operating status, operating set points and operating limits of a machine station and of rotary machines as well as based on expected objective performances of the machines and estimated performance parameters. The solution to the optimization problem is then used for obtaining the load distribution.

At least some of these are associated with fairly extensive processing. There is thus a need for an alternative way of obtaining a load distribution using a limited amount of processing.

SUMMARY

The present invention addresses this situation. The invention therefore aims at solving the problem of providing an alternative way of obtaining a load distribution using a limited amount of processing.

This object is, according to a first aspect of the invention, solved through a method of determining set points of machines, energy storage units, wind generators and/or solar panels in a power system, the method comprising the steps of:
  determining, during operation of the power system, current individual efficiency curves of machines, energy storage units, wind generators and/or solar panels, each such curve defining the efficiency of the corresponding machine, energy storage unit, wind generator and/or solar panel, where a current efficiency curve is obtained as a real-time estimation using current and historic power system data, and at a point in time of power system control,
  forming a function comprising at least one first expression, where the first expression is a sum of products, each product comprising the power of a machine, energy storage unit, wind generator and/or solar panel times the individual efficiency of the machine, energy storage unit, wind generator and/or solar panel obtained from the corresponding current individual efficiency curve,
  determining a power demand of the system,
  optimizing the function subject to the condition that the sum of powers of the machines, energy storage units, wind generators and/or solar panels reach the power demand,
  determining desired set points of the machines, energy storage units, wind generators and/or solar panels based on the optimization, and
  supplying the set points to the machines, energy storage units, wind generators and/or solar panels.

This object is, according to a second aspect of the invention, solved through a set point determining device for determining set points of machines, energy storage units, wind generators and/or solar panels in a power system, the set point determining device comprising:
  an efficiency curve determining unit configured to determine, during operation of the power system, individual efficiency curves of machines,
  energy storage units, wind generators and/or solar panels each such curve defining the efficiency of the corresponding machine, energy storage unit,
  wind generator and/or solar panel, where a current efficiency curve is obtained as a real-time estimation using current and historic power system data, and
  an optimization handling unit configured to, at a point in time of power system control:
    form a function comprising at least one first expression, where the first expression is a sum of products, each product comprising the power of a machine, energy storage unit, wind generator and/or solar panel times the individual efficiency of the machine, energy storage unit, wind generator and/or solar panel obtained from the corresponding current individual efficiency curve,
    determine a power demand of the system,
    optimize the function subject to the condition that the sum of powers of the machines, energy storage units, wind generators and/or solar panels to reach the desired power demand,
    determine desired set points of the machines, energy storage units, wind generators and/or solar panels based on the optimization and
    supply the set points to the machines, energy storage units, wind generators and/or solar panels.

This object is, according to a third aspect of the invention, achieved through a computer program product for determining set points of machines, energy storage units, wind generators and/or solar panels in a power system, the computer program product being provided on a data carrier comprising computer program code configured to cause a set point determining device to, when the computer program code is loaded into the set point determining device
  determine, during operation of the power system, individual efficiency curves of machines, energy storage units, wind generators and/or solar panels, each such curve defining the efficiency of the corresponding machine, energy storage unit, wind generator and/or solar panel where a current efficiency curve is obtained as a real-time estimation using current and historic power system data, and at a point in time of power system control,
  form a function comprising at least one first expression, where the first expression is a sum of products, each product comprising the power of a machine, energy storage unit, wind generator and/or solar panel times the individual efficiency of the machine, energy storage unit, wind generator and/or solar panel obtained from the corresponding current individual efficiency curve,
  determine a power demand of the system,
  optimize the function subject to the condition that the sum of powers of the machines, energy storage units, wind generators and/or solar panels to reach the power demand, determine desired set points of the machines, energy storage units, wind generators and/or solar panels based on the optimization, and supply the set points to the machines, energy storage units, wind generators and/or solar panels.

The machines, energy storage units, wind generators and/or solar panels may be considered to be power supply units. The individual efficiency curve of a power supply unit may be determined across its whole operational range, which may be between zero and full load. An efficiency curve may additionally be considered to be an environmental impact curve as the curve is a representation of the environmental impact of the power supply unit when being used. It can readily be seen that a low fuel consumption has a lower impact on the environment than a high fuel consumption. The use of a wind farm and/or a solar panel may in turn be considered to have zero environmental impact, while the environmental impact of an energy storage unit, such as a battery, has a dependency of the environmental impact of the power supply unit from which energy has been loaded into the energy storage unit.

The determining of current individual efficiency curves of machines, energy storage units, wind generators and/or solar panels, may additionally be the determining of current individual efficiency curves of a machine and one or more of a wind generator, solar panel and energy storage unit.

Each efficiency curve may also have a dependency of the power of the corresponding machine, energy storage unit, wind generator and/or solar panel such as the power output by the machine, energy storage unit, wind generator and/or solar panel.

The optimization may also be made based on other conditions. One such condition may be that the individual power of a machine, energy storage unit, wind generator and/or solar panel ranges between zero and a maximum individual output power. Another possible condition may be that the sum of machines, energy storage units, wind generators and/or solar panels with power above zero is equal to or larger than the number of machines, energy storage units, wind generators and/or solar panels that are used to contribute to the power of the power system.

The present invention has a number of advantages. It provides power savings in that it allows an efficient load sharing among the power supply units. It is also not based on prediction but only on historic and current power system data. Thereby the amount of processing is also limited.

BRIEF DESCRIPTION OF THE DRAWINGS

The present invention will in the following be described with reference being made to the accompanying drawings, where.

DETAILED DESCRIPTION

In the following, a detailed description of preferred embodiments of a method, set point determining device and computer program product for determining set points in a power system will be given.

Figure 1:
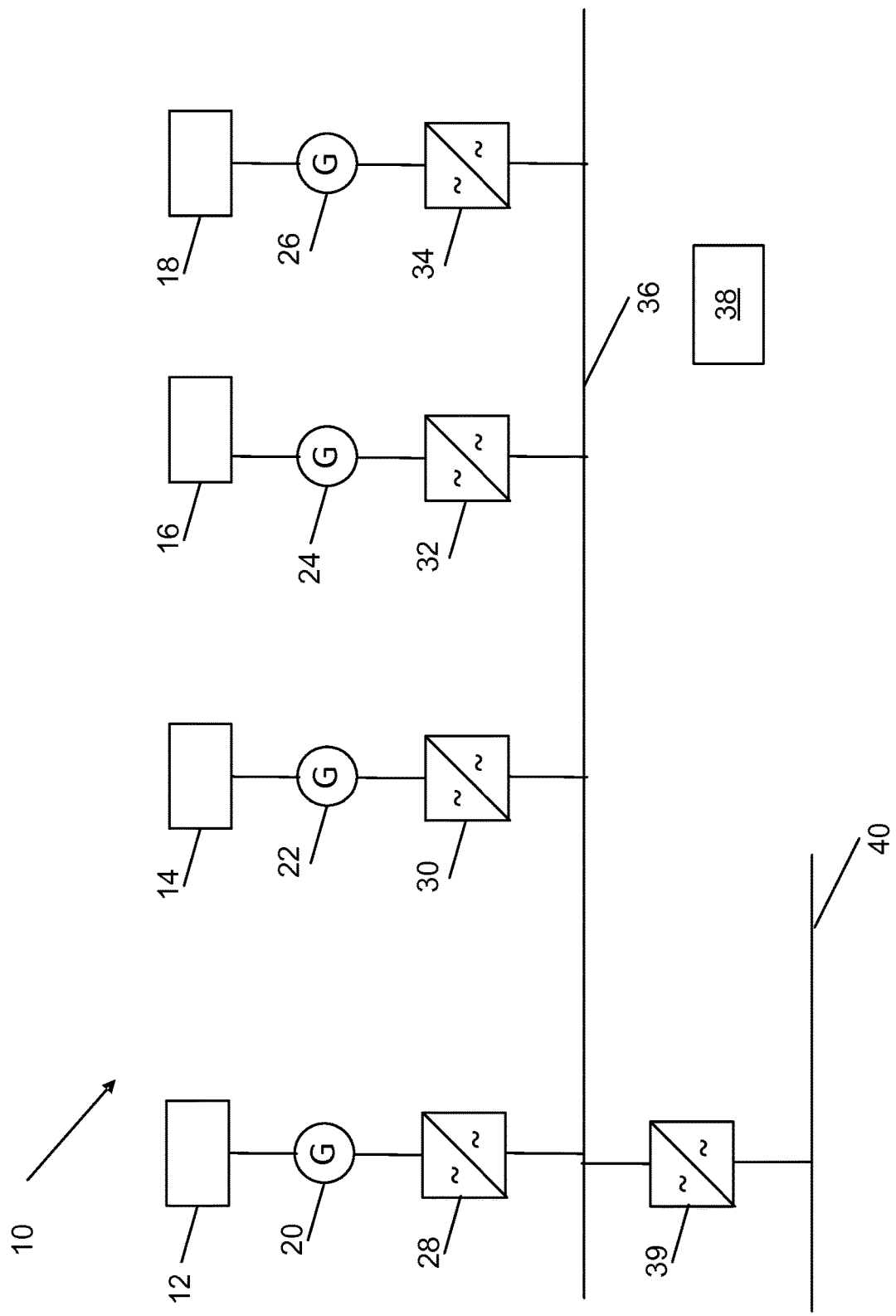
FIG. 1 schematically shows a power system comprising a set point determining device, a power grid and a number of machines being connected to the power grid via generators and converters.

FIG. 1 schematically shows a power system 10 in a power plant, which power system as an example is a power generation system. The power system 10 comprises a bus 36. The system 10 more particularly comprises a number of power supply units 12, 14, 16 and 18, which power supply units may be power generating and/or power receiving machines and are connected to the bus 36 via corresponding generators 20, 22, 24 and 26 and converters 28, 30, 32 and 34. As an example there are four machines. There is thus a first machine 12 connected to the bus 36 via a first generator 20 and a first converter 28, a second machine 14 connected to the bus 36 via a second generator 22 and a second converter 30, a third machine 16 connected to the bus 36 via a third generator 24 and a third converter 32 and a fourth machine 18 connected to the bus 36 via a fourth generator 26 and a fourth converter 34.

The machines may additionally be primary movers, for instance engines such as diesel engines or gas turbines. However, it is possible with other types of power supply units than machines, such as wind generators and/or solar panels and energy storage elements such as batteries. In this case these further power supply units may also be connected to the bus 36.

The bus 36 is in the example of FIG. 1 an Alternating Current (AC) bus and for this reason the converters 28, 30, 32 and 34 are AC/AC converters. However, it is possible that the bus is a Direct Current (DC) bus, in which case the converters may be AC/DC converters. As another alternative it is also possible that the converters are omitted. The system 10 may also be connected to a grid 40, such as a utility grid. This is indicated in FIG. 1 through the bus 36 being connected to a grid 40 via a further converter 39.

Figure 2:
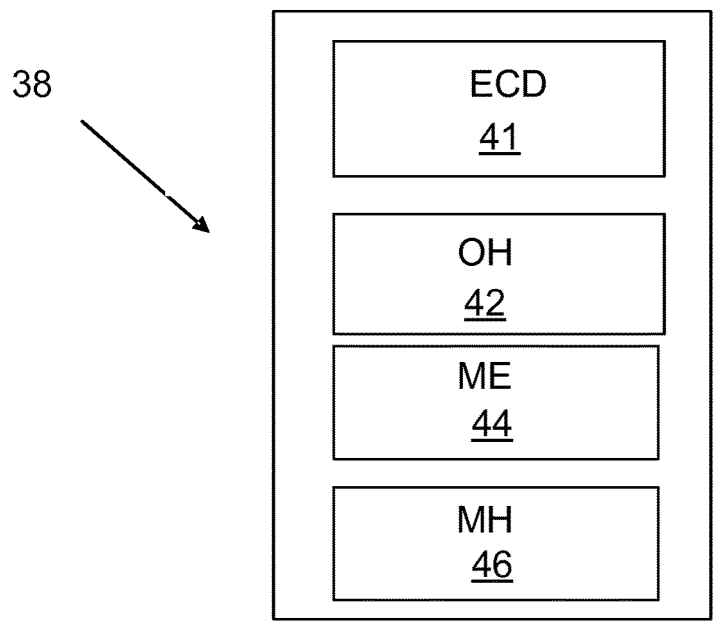
FIG. 2 shows a block schematic of one way of realizing the set point determining device.

There is also a set point determining device 38. The device 38 is more particularly a device for determining set points to be used by the power supply units 12, 14, 16 and 18 of the power system 10. One realization of the set point determining device 38 is shown in more detail in FIG. 2. It comprises an efficiency curve determining unit ECD 41, an optimization handling unit OH 42, a machine evaluating unit EV 44 and a maintenance handling unit MH 46.

The set point determining device 38 thus determines set points for use in the operation of the power supply units in order to obtain an optimal operation, which optimal operation may involve operating the machines as efficiently as possible while at the same time achieving a control objective. The control objective may as an example be to deliver a certain amount of power to the grid 36 from the machines, for instance in order to be exported to a power transmission system. The efficiency may therefore also be an efficiency that depends on the power of the power supply unit, such as the output power of the power supply unit. The efficiency may therefore be the efficiency of the power supply unit in the generation of this output power. It may as an example be an efficiency seen as the amount of fuel or emissions required for delivering said amount of power. The efficiency may additionally or instead be related to the environmental impact of a power supply unit.

A power supply unit, such as a machine, operates a load, which load may range between zero and full load, i.e. between 0-100%.

In one example, the power supply units are engines, and in the case of an engine, such as an internal combustion engine, the efficiency may be the fuel efficiency.

No internal combustion engine, neither rotating nor reciprocating, can yield the same fuel efficiency across the whole operational range, i.e. from zero to full load. Normally it is more efficient to operate above 60% of rated power. One commonly used measure of the fuel efficiency is the Brake Specific Fuel Consumption (BSFC), often given as g/kWh. BSFC may also be provided in the form of a curve.

As the load is increased above 60% load the fuel efficiency increases. The optimal working point of a machine may as an example be at about 75% load, but towards full load it drops off again.

It is typically more efficient to distribute any load equally, in percentage of nominal/rated power, between the machines than to let one machine run at almost idle and another take the majority of the load, as long as the power system is equipped with identical machines, or at least machines of the same type, albeit of different size. This could well eliminate the need for a more thorough strive towards a marginally better solution.

However, as time goes by and running hours accumulate, no machine will feature the exact same characteristic. Wear and tear, air filters, status of turbo chargers, different fuel qualities, etc.: it all adds up to individual, unique BSFC curves.

Moreover, it is possible that different machines, such as different brands and different sized machines are used. It may therefore be a need for improving the overall efficiency of the use of the machines in the power system 10, in FIG. 1. However, in order to improve on this overall efficiency or system efficiency it may be necessary to obtain knowledge of the efficiency of the individual machines.

The fuel efficiency may have an impact also on various emissions. Examples of emissions from internal combustion engines are:

Carbon dioxide—$CO_2$
Carbon monoxide—CO
Residue Hydro-Carbons—HC
Soot & particles (Particular Matter)—PM
Nitrogen Oxides—NOx
Sulphur Oxides—SOx Measuring fuel flow and electric energy produced is common in almost all power systems. To measure the amount of emissions as a function of kWh is often more complicated. It is therefore possible to calculate a theoretic amount of emitted residue depending on the type of fuel and fuel quality used. It can in this way be seen that the fuel efficiency may be used also for the determining the efficiency in relation to emissions.

The efficiency may additionally be considered to be an environmental impact curve as the curve is a representation of the environmental impact of the power supply unit when being used. It can readily be seen that a low fuel consumption has a lower impact on the environment than a high fuel consumption. The use of a wind generator lie a wind turbine and/or a solar panel may in turn be considered to have zero environmental impact, while the environmental impact of an energy storage unit, such as a battery, has a dependency of the environmental impact of the power supply unit from which energy has been loaded into the energy storage unit.

Figure 3:
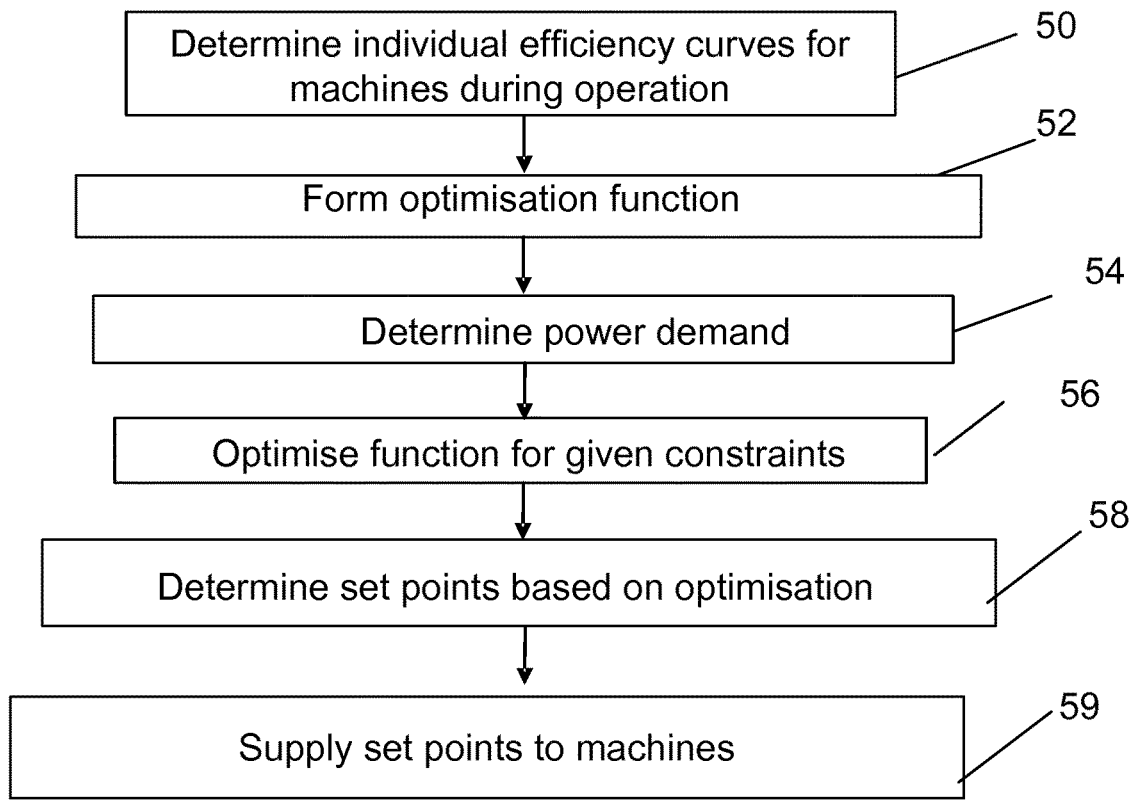
FIG. 3 shows a flow chart of number of method steps in a method of determining set points of the machines in the power system being performed by the set point determining device.

A method of determining set points of the power supply units in the power system and being performed by the set point determining device 38 will now be described with reference also being made to FIG. 3. Moreover, during this operation it is possible that only some power supply units are used to contribute power to the grid, e.g. only some machines are running. The remaining may thus not make such a contribution and may therefore be considered as idle.

A method of operating the set point determining device 38 may start through the efficiency curve determining unit 40 determining, during operation of the power system 10, current individual efficiency curves, step 50, where each curve defines the efficiency of the corresponding power supply unit across its whole operational range. The efficiency curve determining unit 41 may then determine the efficiency of each of the power supply units from a zero to a full (100%) load. The efficiency curve may describe the efficiency as a function of the power of the power supply units and thereby the efficiency depends on the power of the power supply units. Thereby there is a determining of current individual efficiency curves of machines, energy storage units, wind generators and/or solar panels, which may be the determining of current individual efficiency curves of a machine and one or more of a wind generator, solar panel and energy storage unit.

Figure 4:
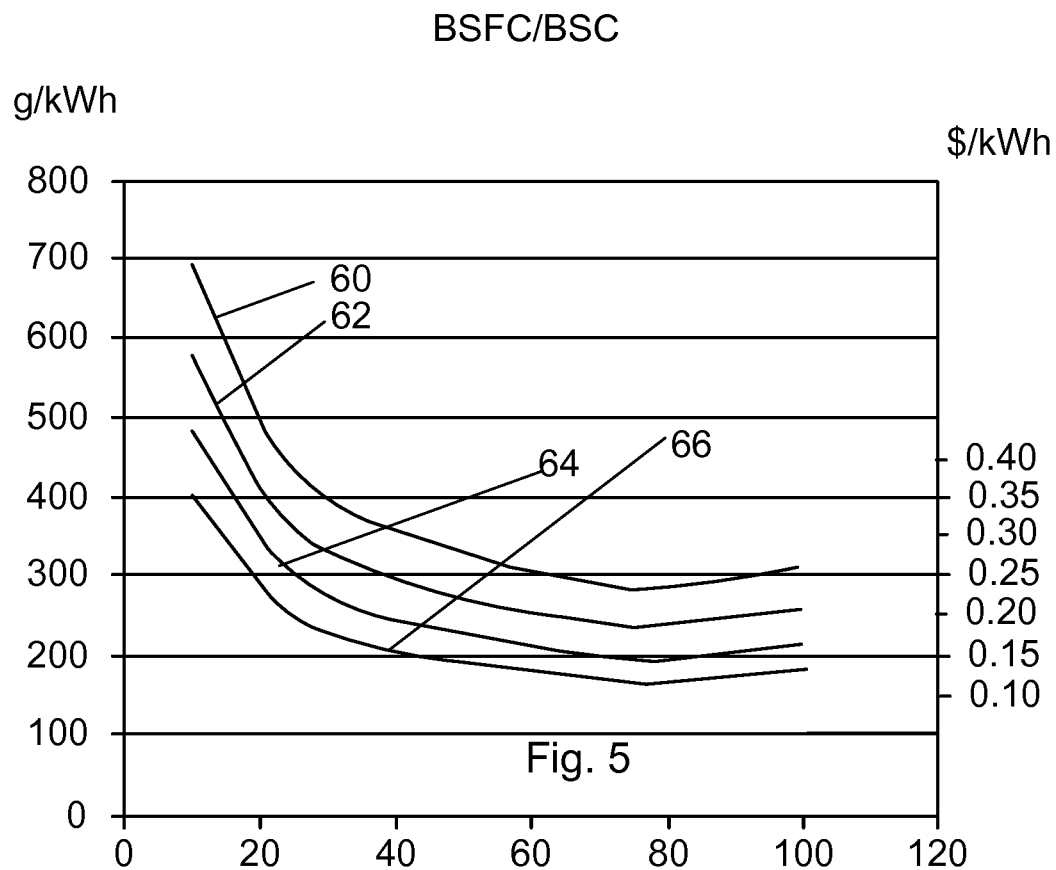
FIG. 4 shows a number of efficiency curves of the machines in the power system, and FIG. 5 schematically shows a data carrier with computer program code, in the form of a CD-ROM disc, for implementing the set point determining device.

Such curves in the form of BSFC curves for the four machines in FIG. 1 are as an example shown in FIG. 4. There is thus a first efficiency curve 60 for the first machine 12, a second efficiency curve 62 for the second machine, a third efficiency curve 64 for the third machine 16 and a fourth efficiency curve 66 for the fourth machine 18.

The curves 60,62,64 and 66 shows the dependency of an operational machine parameter such as the fuel consumption to the energy consumed or delivered, for instance expressed in g/kWh (left vertical axis) in relation to the load in percent (horizontal axis). Theses curves have also been plotted as cost curves, such as Brake Specific Cost (BSC) curves, as an example expressed as the cost in S per kWh (right vertical axis). A curve may therefore be seen as showing a characteristic of the corresponding power supply unit (exemplified by fuel consumption) having a dependency of the output power.

An individual efficiency curve may in this case be a BSFC or BSC curve determined for the machine during operation, where the BSFC curve provides the curve as a fuel consumption and the BSC is a measure using the fuel consumption combined with the fuel price.

The BSFC curve for any engine can be plotted by measuring the amount of fuel consumed in order to produce a certain amount of kWh. When the BSFC characteristic is known for all machines in a power generating system, it is possible to seek to meet any power demand as efficiently as possible by iteration of various loads distributed to various machines.

In order to perform various types of operations, the efficiency curve determining unit may handle an original efficiency curve, a nominal efficiency curve and a current efficiency curve. An original efficiency curve typically remains unchanged for a handful of years, e.g. every 3rd year in connection with performance testing upon overhaul. A nominal efficiency curve is in turn a curve that is applicable for a number of days, typically one or two. It may as an example be updated once per day or every other day. A current efficiency curve in turn is updated on a minute scale, typically every 10-30 minutes.

The original efficiency curve may also be termed a long-term efficiency curve, the nominal efficiency curve may be termed a medium-term efficiency curve and the current efficiency curve may be termed a short-term efficiency curve.

In order to obtain the curves, the efficiency curve determining unit 41 may extract or model an original curve BSFC_0 based on supplier info, performance test or long-term measurements. It may thus obtain an original curve based on information about the machine provided by the machine supplier, based on performance tests made on the machine or on long term measurements of the machine, which tests may be made regularly with intervals based on years.

The BSFC characteristic can thus be obtained during operation of the power generating system 10, i.e. online.

A first step of such an obtaining could be to obtain an off-line original curve based on supplier information and/or performance tests. This may be followed by on-line adaptation of the original curve.

In the online BSFC adaptation, the nominal efficiency curve BSFC_n that is to be used for maintenance purposes, may then be set equal to the original curve BSFC_0. The nominal efficiency curve is therefore indicative of when maintenance is to be made. As it is initially set to be equal to the original efficiency curve, it is clear that initially no maintenance is contemplated.

Set BSFC_n=BSFC_0

Thereafter the efficiency curve determining unit 41 receives new measurements, which may be measurements of fuel consumption and load. Thereafter the efficiency curve determining unit 41 may perform signal filtering and outlier detection, after which follows steady state detection, which may thus involve filtering out outliers and noise from the measurements. When this has been done, the efficiency curve determining unit 41 puts the «Good» measurements in a buffer, which measurements are thus the basis of a curve to be formed.

It is possible that in order to obtain the current efficiency curve BSFC_c interpolation between the measured working points is performed, say for every 10% increments across the operational capability range. It might also be necessary to apply techniques to smoothen the curve like curve fitting.

Once a curve profile BSFC_c has been established there might be new measurements made at various loads that do not quite fit with the established curve. It has to be evaluated whether the current profile shall be kept but shifted so that it fits the current measured values to match changes in weather, fuel quality, seasonal changes, etc. or be under continuous improvement.

System identification and modeling of current fuel efficiency of the machine may thereby be made in an adaptive manner, i.e. in a real-time estimation of the curve BSFC_c from noisy and poor quality measurements. As a current efficiency curve is updated on a minute scale, it is clear that the curve is obtained using current and previous power system data, which power system data may comprise current and previous or historic measurements of the corresponding power supply unit. As the current and previous or historic measurements are obtained during operation of the power system, it is also evident that they are obtained during current and previous use of the power supply unit. The current efficiency curve is thus obtained as a real-time estimation using current and historic power system data, which current and historic power system data may comprise measurements of the corresponding power supply unit.

When a curve BSFC_c has been finalized, the efficiency curve determining unit 41 may optionally investigate if a first difference D1 between the nominal and current curves is persistently large, and if it is the nominal curve BSFC_n is updated. Thus, if the nominal efficiency curve BSFC_n during operation of the power system 10 deviates from the current efficiency curve with more than an allowed degree of deviation, such as more than 5-10%, then it may be updated. The nominal curve may more particularly be updated using the current efficiency curve BSFC_c.

This may be expressed as:

Update BSFC_n if D1=(BSFC_n−BSFC_c) is persistently large,

The above-mentioned curve forming may be performed for all the machines. A first curve 60 of the first machine 12, a second curve 62 of the second machine 14, a third curve 64 of the third machine 16 and a fourth curve 66 of the fourth machine 18 are thus determined by the efficiency curve determining unit 41, see also FIG. 4.

The BSFC/BSC characteristics may have to be passed to a centralized algorithm that continuously tries to improve the overall BSFC/BSC or overall efficiency of the power generation system 10 for any given load situation by iteration of several possible load distribution profiles.

In the example given above, the efficiency curves were the efficiency curves of machines such as engines. Efficiency curves may be obtained also for other types of power supply units, such as batteries, wind turbines and solar cell panels. The efficiency curve of a wind turbine or a solar panel may in this case be formed as a constant cost, for instance through a straight line, which may for instance be a a constant zero cost function.

The efficiency function of a battery may instead be a function associated with the cost of storing energy in the battery. This cost or efficiency function may be the efficiency function of the power supply unit of a power supply unit used to charge the energy storage unit. The cost may then be the cost at the time of charging the energy storage unit or the cost at the time of discharging the energy storage unit, where additionally an efficiency of the energy storage element may be considered.

An efficiency curve may additionally be considered to be an environmental impact curve as the curve is a representation of the environmental impact of the power supply unit when being used. It can readily be seen that a low fuel consumption has a lower impact on the environment than a high fuel consumption. The use of a wind generator, i.e. a wind turbine, and/or a solar panel may in turn be considered to have zero environmental impact, while the environmental impact of an energy storage unit, such as a battery, has a dependency of the environmental impact of the power supply unit from which energy has been loaded into the energy storage unit.

Therefore, when the curves have been determined in this way, the optimization handling unit 42 then operates using these curves. The operation in relation to a point in time of the control of the power system 10, when a number of machines n are running may then be the following.

The optimization handling unit 42 formulates an optimization problem for redistribution of a given load at the point in time of the control using the different efficiency curves of the machines. It also solves the optimization problem numerically and determines new set points for the machines to be used at the point in time of the power system control.

This may be done through the optimization handling unit 42 forming an optimization function OPT comprising a first expression, which first expression in turn is made up of a sum of products, each product comprising the output power of a machine times the individual current efficiency curve of the machine, step 52.

In one variation, the optimization function OPT is formed as the sum of the current efficiency curves BSFC_c of the machines times the output power, which is the output power corresponding to a load on a machine. Moreover, as the BSFC is expressed as the fuel consumption that varies with the load, it is clear that the BSFCs have a dependency on the output power.

If there are n running machines then the optimization function may be set out as $$OPT = f(P) = \sum_{i=1}^{n} BSFC_i(P_i) * P_i$$

where $P_i$ is the output power of the individual machine.

The function may thus be a function of the machines that at the point in time of control are contributing power to the power system. The machines may thus be machines that contribute to a power level of the power system at the point in time of the power system control.

The optimization handling unit 42 also determines a power demand Pa of the plant or power system, step 54.

This is then followed by the optimization handling unit 42 optimizing the function OPT for a number of given constraints, step 56, which optimizing may be the minimizing of the above-mentioned function OPT, which may thus be a minimizing of the function f(P).

It should here be realized that depending on how the optimizing function and/or the efficiency is realized an optimization may as an alternative involve a maximizing of an optimizing function.

The optimization performed by the optimization handling unit 42 may be the subject of one or more optimization conditions, which conditions form the above-mentioned constraints. These conditions may as an example comprise the condition that the sum of output powers $P_i$ should reach the power demand $P_d$, which in the example above would be that the sum of output powers $P_i$ should be equal to the power demand $P_d$. The conditions may also comprise the conditions that the individual output power $P_i$ of the machines range between zero and a maximum individual output power $P_{maxi}$ and that the sum of machines with power above zero is equal to or larger than the number n of running machines or spinning reserve.

These constraints may mathematically be described as $$\sum_{i=1}^{n} P_i = P_d$$

$$o \leq P_i \leq P_{imax}$$

$$\sum_{i=1}^{n} (i: Pi > o) \geq N$$

The optimization handling unit 42 then determines operating points or set points of the running machines based on the optimization, step 58.

As a result of the optimization there may be obtained a load of each of the machines. Each such load may then be translated into one or more set points. Examples of set points for a machine are rotational speed and torque.

The new set-points should be passed out to the individual machines. These are thus supplied to the machines from the optimization handling unit 42, step 59.

Care may have to be taken to avoid excessive load transients on machines due to changes in the perceived efficient solution—a hysteresis of sorts, a time delay.

Once the set points have been determined, they may be automatically applied in the machines. As an alternative they may be presented to an operator for suggestions to be implemented.

It can thereby be seen that the set points for the machines are used in providing the power.

It may here also be mentioned that it is possible that the above-mentioned optimizing function OPT is also used for determining an optimum number of machines to be used. In case the number of machines that are being run is n, then one way in which this optimization may be performed is through the optimization handling unit 42 performing an optimization with regard to the load for the use of n−1 and n+i machines in addition to the above-mentioned optimization for the number n. It may thus additionally form and optimize a function for a fewer number of machines as well as form and optimize a function for a higher number of machines than the number that contribute to the current power level. If for instance three machines are operated at the point in time of the control, then the first optimization is made for these three machines and the further optimizations performed for two and four of the machines.

The machine evaluating unit 44 may then compare the different optimizations and select the best, which in the case of a minimization would be to select the one that is lowest. If then the minimized function for n−1 or n+1 is lower than the minimized function for n, then that optimization may be selected instead of the minimization made for n, and a machine also suggested to be turned off or turned on.

Another way is to include the number of machines as an expression in the optimization function. The optimization function could then be formed as the first expression f(P) plus a second expression $c_s^T * u$, such that the optimization function would be:

$$OPT = f(P) + c_s^T * u,$$

where $c_s^T$ is a vector of starting cost values associated with the machines according to $c_s^T = [c1,s, \ldots, cn,s]$, and u is a vector with binary operation settings $u_i$ for each of the machines, where a setting of zero means that the corresponding machine is non-running and a setting of 1 that it is running. This may be expressed as $u_i = \{0, 1\}$ $c \in R^{n \times 1}$.

A value cj,s is thus the cost for starting a machine, u=1 is a running machine and u=0 is a non-running machine. Moreover cj,s of an already started machine is zero. It can thereby be seen that the second expression is a sum of products, where each product is the cost of starting a machine times the binary setting of that machine as running or non-running.

The thus adjusted optimization function may then be minimized with regard to the first expression as well as the second expression, i.e. with regard to P and with regard to u subject to the fulfilment of the constraints.

A further condition of $$P_i \leq M * u_i$$

may be set for the function OPT, where M may be an arbitrarily set constant.

This further condition specifies that power can only be output by a machine that is running.

It can thereby be seen that the desired set points of the machines are determined based on the selected optimization and for the machines of the optimization. The set points and machines may also be automatically selected or presented to a user. It can in this way be seen that the number of machines and their corresponding set points may be selected.

The machine evaluating unit 44 may thus start or stop machines based on the optimization. It can thereby be seen that a means may be provided for automatic start and stop of machines based on cost calculations.

A third possible expression that may be used in the optimization function either in addition to or instead of the second expression, is an expression defining the cost of delivering or supply of power to a grid.

In this case the optimization function also comprises a third expression set out as a function of the power of the grid:

The optimization function may in this case be obtained as:

$$OPT=f(P)+f(P_{grid})$$

where $P_{grid}$ is the power delivered to the system 10 from the grid 40 ($P_{grid}>0$) or the power delivered from the system 10 to the grid 40 (Pgrid<0). In this case $f(P_{grid})=C_G+$ if $P_{grid}>0$ and CG− if $P_{grid}\leq 0$.

The constant $C_G+$ then represents the cost associated with the delivery of power from the grid to the system and the constant $C_G-$ the possible earnings associated with the delivery of power from the system to the grid. The constant $C_G+$ in this case has one polarity, while the constant $C_G-$ may have an opposite polarity. It can here be further stated that $C_G-$ may also set to zero.

The function defined by the third expression is thereby set as a first constant having one polarity for a first direction of power transfer between the power system and the grid and as a second constant having an opposite polarity or being zero for a second direction of power transfer between the power system and the grid.

In this case the power demand constraint may be set as:

$$\sum_{i=1}^{n} P_i + P_{grid} = P_d$$

The optimization that is made based on the third expression may be used to determine whether power is to be delivered to or drawn from the grid 40.

As was stated above, it is furthermore possible that the system may comprise windfarms and batteries. The optimization function may then compromise a fourth expression in the form of a function of the power of a windfarm Pwf and a fifth expression in the form of a function of the power of the battery or energy storage $P_{ES}$.

In this case the function OPT may be formed as:

$$OPT=f(P)+f(P_{grid})+f(P_{WF})+f(P_{ES}),$$

The function of a wind farm $f(P_{WF})$ may be formed as a constant for instance as a constant zero cost function. Here the function of the power of the energy storage $P_{ES}$ may be set in the same way as the function of the grid, i.e. as $$f(P_{ES})=C_{ES}+ \text{ if } P_{ES}>0 \text{ and } C_{ES}- \text{ if } P_{ES}\leq 0.$$

The function $f(P_{ES})$ thus has the constant or value $C_{ES}+$ in case the batteries are discharged or the constant or value $C_{ES}-$ in case the batteries are charged, which values have opposite polarities.

These values may additionally be the values associated with the cost of storing energy in the energy storage. The constant CES+ may additionally be adjusted by an efficiency value η of the energy storage such that it is lower than the absolute value of CES−.

Here it may also be mentioned that it is possible that the curves may be used also for determining that maintenance is to be performed on the machines. This functionality may be implemented by the maintenance handling unit 46.

The maintenance handling unit 46 may for each machine compare the nominal curve BSFC_n with the original curve BSFC_0 during operation of the power system and if there is a significant difference D2, i.e. if the nominal efficiency curve deviates from the original efficiency curve with more than an allowed degree of deviation, such as 20-30%, then the maintenance handling unit 46 may indicate that maintenance is needed or due, for instance to indicate that long term maintenance like condition-based water washing is due.

It may thus raise a flag if D2=(BSFC_0−BSFC_n) is persistently large. Based on this flag it is also possible that the machine in question is turned off by the maintenance handling unit 46, either directly or at a following maintenance interval.

The set point determining device 38 may also provide a user interface, where an operator can see the cost curves, the actual cost ($/kWh) per machine and the total cost curves. As is mentioned earlier, the set point determining device 38 shall allow for manual or automatic operation; in both cases it calculates the best optimal operating or set points and allow the operator to either manually set the set points or lets the machines follow the set points automatically.

The above-mentioned optimization and determining of individual BSFC/BSC curve offers the possibility to move the operating point of a machine with respect to fuel consumption or cost per kWh. It may be a fixed load mode of operation, but it may also follow some rules when it comes to utilization. It is for instance possible that the optimization is only performed if sufficient power margins are present. Such sufficient power margins may be based on a minimum number of running machines and/or a minimum spinning reserve.

The rule for implementing the optimization together with or without automatic start and stop of machines, may as an example follow the following rule:

If Popt≥Pwp+Psp_res0 then
Optimize_Allowed:=true; else
Optimize_Allowed:=false; end if;

where Psp_res is the power of the spinning reserve, Popt is the optimized output power and Pwp is the power of the current working point, i.e. the power at the point in time of the control.

This rule thus states that if the optimized output power is higher than or equal to a sum made up of the power of the current working point plus a safety margin (spinning reserve), then optimization is allowed, otherwise it is disallowed.

Alternatively, the engagement of the optimization function could follow the same basic rules as for any other fixed load—there must always be a "swing machine" present in an electrical network.

It can be seen that the set point determining device 38 seeks to produce the demanded power as efficiently as possible with the number of machines available. As an example, instead of actually distributing load, e.g. 5%-50%-50% it could seek a solution of 75%-75%-0%, leaving it to the operator to make a decision on whether to keep a machine running or shutting it down all together.

For the system to be able to seek an overall efficient solution it is possible that a machine at idle is disregarded from the calculations.

It is also possible that the above-mentioned start and stop functionality attempts—or advices—to stop a machine if it was below e.g. 60% load as long as the new load distribution would not prompt an immediate start of a machine, i.e. push a machine above, say, 90% load.

Efficient sharing combined with an Automatic Start and Stop feature would immediately off-load and stop, or advice to stop the redundant machine in the case above.

For each individual machine a graphical representation of the BSFC/BSC curve onto which the current set-point and working point is plotted should be made similar to the existing Capability Diagram. Once could perhaps use various shades/colors to denote "clean" operational regimes.

The overall efficiency of the plant can be presented in much the same way or as a three-dimensional graph showing BSFC/BSC as a function of power and spinning reserve or number of running units.

The HMI should also show the overall total generating cost both as a number and as a trend curve. The values/trend curves may be the actual cost curve, the curve for Equal Share mode and the curve for Optimum Mode.

Calculating the optimum set points could be performed also when machines are not in Auto mode; the operator can then compare the actual cost with the calculated optimum cost and the actual working point with the calculated optimum set point, and choose to set the set points equal to the calculated optimum set points manually.

The invention has a number of advantages. By using real-time, data driven modelling of the individual machine efficiencies and utilizing these individual differences, it is possible to share the load in a more fuel/cost/energy optimal manner among the diverse power supply units. Examples of possible improvements are in the range of 4.5-6%.

The core of the function will be to, for a given total load, calculate the optimal distribution of this power to the power generation machines.

The function can be used for calculating the optimum number of running power generation machines; if n machines are running, the function can also calculate the cost for fewer or more machines, and thereby provide a mean for automatic start and stop of machines based on cost calculations.

The function may additionally consider delivery of power to and from a grid as well as the use of other energy sources such as windfarms and batteries.

Where fuel consumption measurements are available, the function can calculate the fuel cost per machine (e.g. $/kWh), and thereby provide means for improving the fuel cost curve of each machine. The function of altering the cost curve by actual measurements can be proved useful taking into account ageing of the machines and also the climate and ambient conditions that change over time, e.g. over the year.

The efficiency was above described in relation to fuel. However, it is possible to also consider the efficiency in relation to emissions, such as:

Carbon dioxide—$CO_2$
Carbon monoxide—CO
Residue Hydro-Carbons—HC
Soot & particles (Particular Matter)—PM
Nitrogen Oxides—NOx
Sulphur Oxides—SOx.

Figure 5:
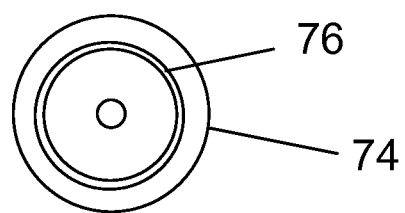

The set point determining device may be implemented using software. It may thus be implemented using computer program code, which may be provided on one or more data carriers which performs the functionality of the set point determining when the program code thereon is being loaded into a computer. One such data carrier 74 with computer program code 76, in the form of a CD ROM disc, is schematically shown in FIG. 5. Such computer program may as an alternative be provided on another server and downloaded therefrom into the computer.

The invention claimed is:

1. A method of determining set points of machines and energy storage units in a power system, the method comprising the steps of:

determining, during operation of the power system, current individual efficiency curves of machines and energy storage units, each such curve defining the efficiency of the corresponding machine or energy storage unit, where the efficiency of a machine is based on an amount of fuel and emissions required for delivering an amount of power and related to an environmental impact of the machine, and the efficiency of an energy storage unit is based on the efficiency of the machine used to charge the energy storage unit and where a current efficiency curve is obtained as a real-time estimation using current and historic power system data, and at a point in time of power system control, forming a function including at least one first expression and one second expression, where the first expression is a sum of products, each product including the electric power of a machine or energy storage unit times the individual efficiency of the machine or energy storage unit obtained from the corresponding current individual efficiency curve, where the second expression includes starting cost values associated with the machines, determining a power demand of the system, optimizing the function subject to the condition that the sum of electric powers of the machines and energy storage units reach the power demand, and determining desired set points of the machines and energy storage units based on the optimization, and supplying the set points to the machines and energy storage units.

2. The method according to claim 1, wherein each efficiency curve defines the efficiency of the corresponding machine or energy storage unit as an efficiency that depends on the power of the machine or energy storage unit.

3. The method according to claim 1, wherein the forming and optimization of the function is performed for the running machines and energy storage units that reach the power demand.

4. The method according to claim 3, wherein the forming of a function and optimizing is performed also for non-running machines and/or energy storage units and further including selecting the number of machines and/or energy storage units to be run based on said optimization.

5. The method according to claim 4, wherein the number of machines and energy storage units is reflected by the second expression in the function including a number of products, each product including the cost of starting a machine and/or energy storage unit times a binary function of running or not running the machine and/or energy storage unit.

6. The method according to claim 1, wherein the power system is connected to a grid and the function further includes a third expression set out as a function of the power of the grid, which function is set as a first constant having one polarity for a first direction of power transfer between the power system and the grid and as a second constant having an opposite polarity or being zero for a second direction of power transfer between the power system and the grid.

7. The method according to claim 1, further comprising investigating if sufficient power margins are present and only performing the optimization in response to the sufficient power margins being present.

8. The method according to claim 1, further comprising determining that maintenance is due for a machine and/or energy storage unit in response to a nominal efficiency curve of the machine and/or energy storage unit deviating from an original efficiency curve of the machine and/or energy storage unit with more than an allowed degree of deviation.

9. The method according to claim 8, wherein the nominal efficiency curve is initially set as the original efficiency curve and is updated using the current efficiency curve, in response to the nominal efficiency curve during operation of the power system deviating from the current efficiency curve with more than the allowed degree of deviation.

10. A set point determining device for determining set points of machines and energy storage units in a power system, the set point determining device comprising:
an efficiency curve determining unit configured to determine, during operation of the power system, current individual efficiency curves of machines and energy storage units, each such curve defining the efficiency of the corresponding machine or energy storage unit, where the efficiency of a machine is based on an amount of fuel and emissions required for delivering an amount of electric power and related to an environmental impact of the machine, and the efficiency of an energy storage unit is based on the efficiency of the machine used to charge the energy storage unit and where a current efficiency curve is obtained as a real-time estimation using current and historic power system data, and
an optimization handling unit configured to, at a point in time of control of the power system:
form a function including at least one first expression and one second expression, where the first expression is a sum of products, each product including the electric power of a machine or energy storage unit times the individual efficiency of the machine or energy storage unit obtained from the corresponding current individual efficiency curve, where the second expression includes starting cost values associated with the machines,
determine a power demand of the system,
optimize the function subject to the condition that the sum of electric powers of the machines and energy storage units reach the power demand,
determine desired set points of the machines and energy storage units based on the optimization and
supply the set points to the machines and energy storage units.

11. The set point determining device according to claim 10, wherein the optimization handling unit when forming and optimizing the function is further configured to form and optimize a function of the running machines and energy storage units that reach the power demand.

12. The set point determining device according to claim 11, wherein the optimization handling unit is configured to form and optimize functions also for non-running machines and/or energy storage units and is further configured to select the number of machines and/or energy storage units to be run based on said optimization.

13. The set point determining device according to claim 12, wherein the number of machines and/or energy storage units is reflected by the second expression in the function including a number of products, each product including the cost of starting a machine and/or energy storage unit times a binary function of running or not running the machine and/or energy storage unit.

14. The set point determining device according to claim 10, wherein the power system is connected to a grid and the function further includes a third expression set out as a function of the power of the grid, which function is set as a first constant having one polarity for a first direction of power transfer between the power system and the grid and as a second constant having an opposite polarity or being zero for a second direction of power transfer between the power system and the grid.

15. A non-transitory computer readable storage medium containing a computer program for determining set points of machines and energy storage units in a power system, said computer program configured to cause a set point determining device to, when said computer program is loaded into the set point determining device,
determine, during operation of the power system, current individual efficiency curves of machines and energy storage units, each such curve defining the efficiency of the corresponding machine or energy storage unit, where the efficiency of a machine is based on an amount of fuel and emissions required for delivering an amount of electric power and related to an environmental impact of the machine, and the efficiency of an energy storage unit is based on the efficiency of the machine used to charge the energy storage unit and where a current efficiency curve is obtained as a real-time estimation using current and historic power system data and
at a point in time of power system control,
form a function including at least one first expression and one second expression, where the first expression is a sum of products, each product including the electric power of a machine or energy storage unit times the individual efficiency of the machine or energy storage unit obtained from the corresponding current individual efficiency curve, where the second expression includes starting cost values associated with the machines,
determine a power demand of the system,
optimize the function subject to the condition that the sum of electric powers of the machines and energy storage units reach the power demand,
determine desired set points of the machines and energy storage units based on the optimization, and
supply the set points to the machines and energy storage units.

16. The method according to claim 2, wherein the forming and optimization of the function is performed for the running machines and energy storage units that reach the power demand.

17. The method according to claim 2, wherein the power system is connected to a grid and the function further includes a third expression set out as a function of the power of the grid, which function is set as a first constant having one polarity for a first direction of power transfer between the power system and the grid and as a second constant having an opposite polarity or being zero for a second direction of power transfer between the power system and the grid.

18. The method according to claim 2, further comprising investigating if sufficient power margins are present and only performing the optimization in response to the sufficient power margins being present.

19. The set point determining device according to claim 11, wherein the power system is connected to a grid and the function further includes a third expression set out as a function of the power of the grid, which function is set as a first constant having one polarity for a first direction of power transfer between the power system and the grid and as a second constant having an opposite polarity or being zero for a second direction of power transfer between the power system and the grid.

* * * * *